United States Patent [19]

Kamiyama et al.

[11] Patent Number: 4,700,026

[45] Date of Patent: Oct. 13, 1987

[54] WIPER HOME POSITION STOP DEVICE

[75] Inventors: Akira Kamiyama, Sakai; Masahide Yamada, Azuma; Katsuyoshi Kitada; Masayoshi Otuka, both of Kiryu; Etsuro Kanematsu, Yabuzukahonmachi, all of Japan

[73] Assignee: Mitsuba Electric Manufacturing Co. Ltd., Gunma, Japan

[21] Appl. No.: 841,158

[22] Filed: Mar. 19, 1986

[30] Foreign Application Priority Data

May 24, 1985 [JP] Japan ............................ 60-77390[U]

[51] Int. Cl.$^4$ ............................................ H01H 19/00
[52] U.S. Cl. ............................... 200/19 R; 15/250.17; 318/DIG. 2
[58] Field of Search ........................ 200/19 R, 61.39; 318/DIG. 2, 9; 15/250.16, 250.17

[56] References Cited

U.S. PATENT DOCUMENTS

4,559,484  12/1985  Hirano ............................ 15/250.17

Primary Examiner—A. D. Pellinen
Assistant Examiner—Morris Ginsburg
Attorney, Agent, or Firm—Kane, Dalsimer, Kane, Sullivan and Kurucz

[57] ABSTRACT

A wiper driving unit for driving a wiper for a vehicle such as a motor vehicle includes: a driving gear driven by a motor, for driving the wiper; and a clutch member formed of a conductive resilient plate, rotatably supported and rotatable together with the driving gear in the biasing direction only when the driving gear is rotated in the biasing direction. An engageable member on the driving side is projectingly provided on the driving gear, and an engageable member on the driven side is connected in operational association to the clutch member. The engageable member on the driving side and the engageable member on the driven side are engaged with each other to rotate the driving gear together with the clutch member in the same direction only when the driving member is rotated in the biasing direction. However, when an external force to rotate the driving gear in the reverse direction is applied, the both engageable members are disengaged from each other, and the clutch member does not follow the rotation of the driving gear in the reverse direction, whereby chattering is prevented which is caused by a relative backwardly moving phenomenon between the conductor plates connected to an electric circuit of the motor and a plurality of contacts provided on the clutch member.

12 Claims, 11 Drawing Figures

WIPER HOME POSITION STOP DEVICE

BACKGROUND OF THE INVENTION

1. Field of the Invention

This invention relates to a wiper driving unit and more particularly to improvements in a wiper home position stop device effective for use in a wiper driving unit mounted on a vehicle such as a motor vehicle which may travel a snowfall zone for example.

2. Description of the Prior Art

In general, in the wiper driving unit mounted on a vehicle such as a motor vehicle, to secure safety in driving, there has been provided an automatic home position stop device capable of moving a wiper blade to a corner of the bottom of a window and stopping it thereat even when a manual control switch is turned off at random.

In the conventional home position stop device of the type described, a conductor plate partially having a non-conductive part is attached to an end face of a driving gear, a switch consituting a switch for opening or closing an electric circuit of a motor in cooperation with the conductor plate is provided on a housing in such a manner that the conductor plate is caused to slide by the rotation of the driving gear. Even when the manual control switch is turned off at random, an electric circuit to the home position is formed by the conductor plate and the contact, a main circuit is shut off at the home position by the non-conductive part of the conductor plate, an armature circuit is short-circuited and an electric brake is applied, whereby a wiper motor is automatically stopped.

However, the wiper driving unit provided with the above-described home position stop device presents such disadvantages that, when an external force working in a direction opposite to the normal rotation is applied to the driven gear as in the case where snow is scraped up to the bottom portion of a front window of a motor vehicle for example, a chattering phenomenon of repeating continuity and discontinuity is generated in a portion between the conductor plate and the contact, whereby deterioration due to the generation of heat, lowering of durability and the like are caused to the aforesaid portion.

SUMMARY OF THE INVENTION

The present invention has been developed to obviate the above-described disadvantages of the prior art and has as its object the provision of a wiper driving unit capable of preventing a chattering phenomenon from occurring.

To achieve the above-described object, the present invention contemplates that a clutch member constituted by a conductive resilient plate material is rotatably provided in a manner to rotate together with a driving gear in the biasing direction, and this clutch member is rotated in sliding contact with a conductor plate connected to an electric circuit of a motor, whereby a switch for opening or closing the electric circuit of the motor is provided, so that, during the normal operation, the clutch member causes the contacts to rotate relative to the conductor plate by the rotation of the driving gear, and, when an external force is applied to the driving gear to rotate the same in a reverse direction, the clutch member is not allowed to follow the rotation in the reverse direction to thereby prevent a relative backwardly moving phenomenon between the contacts and the conductor plates.

BRIEF DESCRIPTION OF THE DRAWINGS

The above and other objects and features of the present invention will become more apparent when referred to the following description given in conjunction with the accompanying drawings, wherein like reference numerals denote like elements, and in which.

DETAILED DESCRIPTION OF THE PREFERRED EMBODIMENTS

Figure 1:
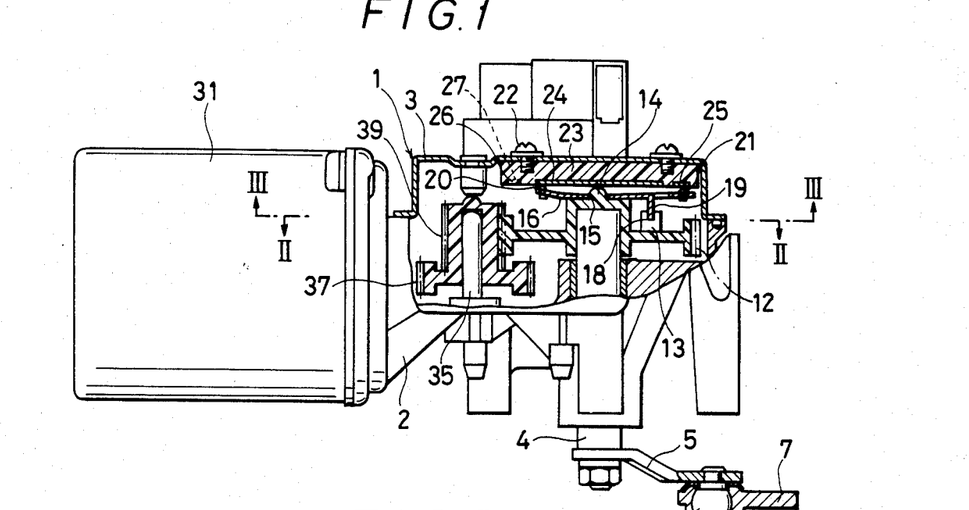
FIG. 1 is a longitudinal sectional view showing one embodiment of the wiper driving unit according to the present invention.

In this embodiment, the wiper driving unit is provided with a housing 1, in which a main body 2 constituting a gear box is covered at an opening thereof with a lid member 3, to thereby form a closed chamber. In the substantially central portion of the main body 2, there is rotatably supported a crankshaft 4. One end of a rod 7 is rotatably connected through a ball joint 6 to a free end of a crank 5 integrally rotatable with the crankshaft 4, and the other end of the rod 7 is rotatably connected to a free end of a linkage 8. One end of the linkage 8 is solidly secured to a shaft 9 rotatably supported at a lower position of a window frame of a motor vehicle. A wiper arm 10, a free end of which holds a wiper blade 11, is integrally rotatably supported by the shaft 9.

Coupled to one end of the crankshaft 4 in the housing 1 in a manner to be integrally rotatable is a driving gear 12 integrally formed of a rigid synthetic resin material. An engageable portion 13 on the driving side is projectingly provided at a portion of an end face or top face of the driving gear 12 on the side of the lid member 3.

Figure 2:
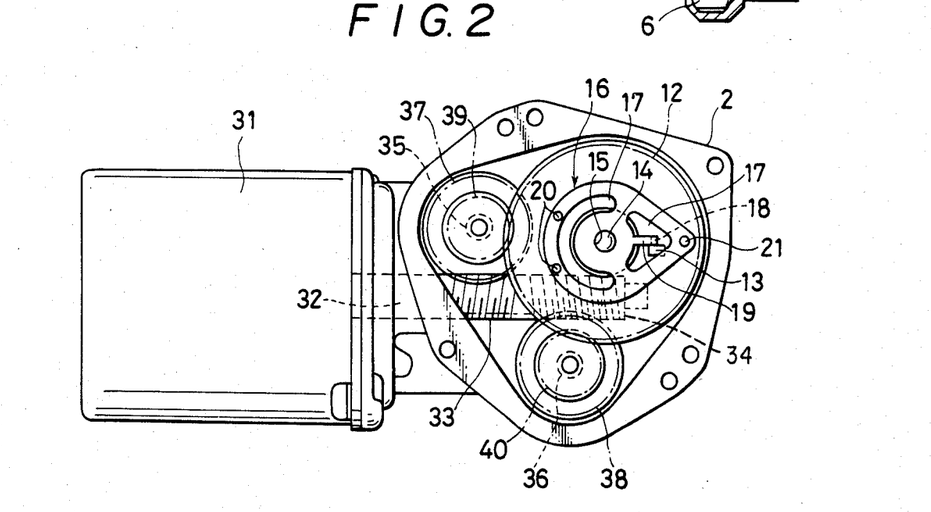
FIG. 2 is a plan view taken along the line II—II in FIG. 1, showing the opened state of the housing.

Integrally, projectingly provided on the top face of the driving gear 12 is a pivot 14 center-aligned with the crankshaft 4. The pivot 14 is coupled into a shaft hole 15 formed at the center of the clutch member 16, the undersurface of which is pressingly contacted and rotatably supported. The clutch member 16 is formed of a plate member having conductivity and suitable resiliency such as brass, and punchingly formed into a generally droplet shape in plan view as shown in FIG. 2. In the clutch member 16, a window hole 17 is punched outwardly of the shaft hole 15. The clutch member 16 is somewhat warped in the thickness-wise direction. The window hole 17 and the warp cooperate with the resiliency of the clutch member 16 itself such that contacts to be described hereunder are brought into pressing contact with a conductor plate under an adequate biasing force.

An engageable portion 18 on the driven side is projected from one side of the clutch member 16 such that a tongue 19 remaining in the window hole 17 after the punching is downwardly bent. The engageable portion 18 on the driven side is constructed such that it is engageable with the engageable portion 13 on the driving side of the driving gear 12 only when the driving gear 12 rotates in the normal direction.

The clutch member 16 is projectingly provided thereon with a pair of first contacts 20, 20 and a second contact 21, all of which are formed of wear resistant tips made of a conductive material. These contacts 20, 20 and 21 are arranged such that the pair of first contacts 20 and 20 are symmetrically located with each other at the side opposite to the contact 21, so that a load acting on the pivot 14 can be uniformized through the resiliency of the clutch member 16 itself.

More specifically, when the respective contacts 20, 20 and 21 are brought into pressing contact with the conductor plates to be described hereunder by the resilient force of the clutch member 16, a load due to a reaction force thereof acts on between the clutch member 16 and the pivot 14. Then, in this embodiment, a plurality of first contacts 20 are provided symmetrically with each other at the side opposite to the second contact 21, whereby the load acting on between the clutch member 16 and the pivot 14 is caused to act on the pivot 14 uniformly, so that the pivot 14 can be prevented from being worn.

An insulated base 23 formed of a generally circular panel made of an insulating material such as synthetic resin is provided concentrically with the center line of the pivot 14 on a surface of ceiling of the lid member 3 and solidly secured thereto by suitable means such as screws 22. A first conductor plate 24 and a second conductor plate 25 are provided concentrically with the center line of the pivot 14 on the undersurface of the insulated base 23 and solidly secured thereto by suitable means such as insert molding.

Figure 3:
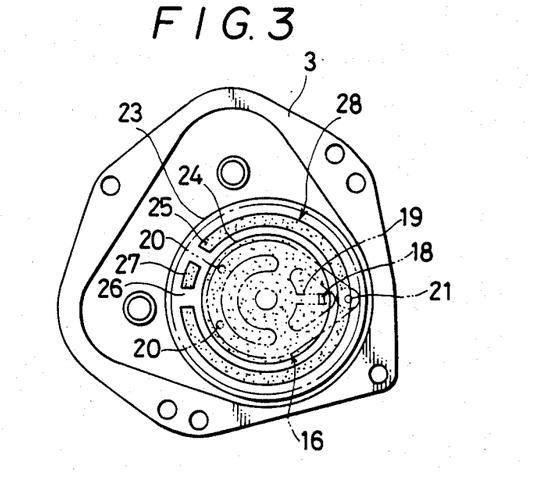
FIG. 3 is a bottom view taken along the line III—III in FIG. 1.

The first conductor plate 24 provided inwardly of the conductor plate 25 is formed into a circular shape, and a pair of first contacts 20 are constantly in pressing contact with this first conductor plate 24 by the resilient force of the clutch member 16. The second conductor plate 25 provided outwardly of the conductor plate 24 is formed into a generally C shape and the cutaway portion of C shape substantially forms a non-conductive portion 26. A stop position piece 27 formed into a generally segmental shape, made of a conductor plate material is provided at the central portion of the non-conductive portion 26. The second contact 21 is constantly in pressing contact with a circular orbit drawn by the second conductor plate 25, the non-conductive portion 26 and the stop position piece 27, by the resilient force of the clutch member 16.

Figure 4:
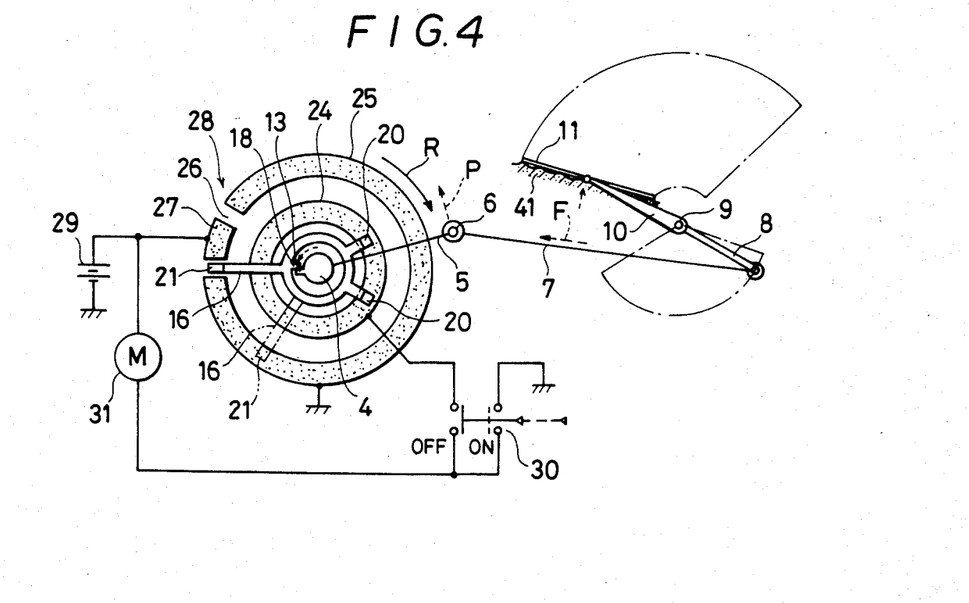
FIG. 4 is a schematic view in explanation of the action.

The first conductor plate 24, the second conductor plate 25 and the stop position piece 27 are connected to one another as shown in FIG. 4 in an electric circuit constituted by a power source 29, a wiper switch 30, a motor 31 and so on, whereby a switch 28 for opening or closing the electric circuit of the motor is formed.

A motor 31 is contiguously provided on one side of the housing 1, and a rotary shaft 32 of the motor 31 penetrates through the main body 2 and inserted into the housing 1 in a direction perpendicularly intersecting the axis of the crankshaft 4. A pair of worms 33 and 34 which have twists opposite to each other (hereinafter, may be referred to as "a right-twisted worm and a left-twisted worm") are integrally formed on the outer periphery of the inserted portion of the rotary shaft 32. A pair of pivots 35 and 36 are protrudingly provided at positions opposed to the worms 33 and 34, respectively, opposite to each other relative to the rotary shaft 32 and in parallel to the crankshaft 4. Worm wheels 37 and 38 are coupled onto the pivots 35 and 36, respectively, and rotatably supported thereon. These worm wheels 37 and 38 are in mesh with the worms 33 and 34, respectively. Intermediate gears 39 and 40 are center-aligned with the worm wheels 37 and 38, which are contiguously and integrally provided thereto, respectively. The both intermediate gears 39 and 40 are in mesh with the driving gear 12.

Description will hereunder be given of action.

(1) Wiping operation

When the wiper switch 30 is turned on, electric current is supplied from the power source 29 to an ON contact of the wiper switch 30 and the grounding, whereby the motor 31 is rotated.

Rotation of the motor 31 is transmitted through the both worms 33, 34, the both worm wheels 37, 38 and the intermediate gears 39, 40, to the driving gear 12. At this time, since the worm wheels 37 and 38 are in mesh with the right-twisted worm 33 and the left-twisted worm 34 at the positions opposite to each other relative to the axis of the rotary shaft 32, the reaction force acts on the rotary shaft 32 uniformly, so that the transmission of the driving force can be effectively performed and durability and the like can be improved.

Rotation of the driving gear 12 is converted into reciprocatory turning of a wiper arm 10 by the crank 5 of the crankshaft 4, the rod 7, the linkage 8 and the shaft 9, and, by this reciprocatory turning, the wiper arm 10 causes the wiper blade 11 to perform the wiping operation.

During this wiping operation, the engageable portion 13 on the driving side and the engageable portion 18 on the driven side are brought into engagement, whereby the clutch member 16 is rotated together with the driving gear 12, so that the first contacts 20, 20 and the second contact 21 which are projectingly provided on this clutch member 16 revolve along a predetermined path in sliding contact with the first and second conductor plates 24 and 25. However, passage of current to the motor 31 is performed by way of the switch 28, so that relative sliding between the contacts and the conductor plates does not affect the rotation of the motor 31.

(2) Normal operation of the home position stop

When the wiper switch 30 is turned off, the ON contact of the wiper switch 30 is opened and the OFF contact is closed.

In the case where the wiper blade is positioned half way of the window when the wiper switch 30 is turned off at random, the first and the second contacts 20, 20 and 21 are in contact with the first and the second conductor plates 24 and 25 as indicated by hypothetical lines in FIG. 4 for example. With this arrangement, the current is supplied from the power source 29 through the motor 31, the OFF contact of the wiper switch 30, the first conductor plate 24, the first contacts 20, 20, the clutch member 16, the second contact 21, the second conductor plate 25 to the grounding, whereby the motor 31 continues its rotation.

As the rotation of the motor 31 continues, the second contact 21 reaches the non-conductive portion 26 of the second conductor plate 25, whereby continuity between the second contact 21 and the second conductor plate 25 is cut off, so that the current is not supplied to the motor 31.

Due to the inertia in the rotary system of the motor 31, the driving gear 12 and so on, when the second contact 21 moves to the stop position piece 27 and comes into contact therewith, a closed circuit is formed which includes the second contact 21, the stop position piece 27, the motor 31, the OFF contact of the wiper switch 30, the first conductor plate 24, the first contacts 20, the clutch member 16 and the second contact 21, whereby an electric brake acts on the motor 31 to stop it abruptly.

Since the interrelation of the component parts is set such that, when the motor 31 is abruptly stopped, the wiper blade 11 comes to the home position at the corner of the bottom of the window, even when the wiper switch 30 is turned off at random, the wiper blade 11 is stopped at the home position at all times.

(3) Stop operation during abnormal time

In the case where a push-back force is applied to the wiper blade 11 when snow 41 is accumulated at the bottom portion of the window as shown in FIG. 4 for example, an external force F indicated by arrow marks with broken lines acts on the wiper arm 10, the rod 7 and the like, whereby a turning force P reverse to a normal turning direction R indicated by an arrow mark with a solid line acts on the crankshaft 4 through the crank 5.

If such arrangements are adopted that the conductor plate 25 or the contact 21 is integrally rotated with the driving gear 12 all the time as in the conventional example, then the contact 21, which has relatively moved to the non-conductive portion 26 along with the normal rotation of the driving gear 12, is relatively returned in the original direction and comes into contact with the conductor plate 25 again, because the driving gear 12 is rotated in the reverse direction by the reverse turning force P applied to the crankshaft 4. This recontact energizes the motor 31 again for rotation, whereby the driving gear 12 rotates in the normal direction R, so that the contact 21 moves to the non-conductive portion 26 again. When the contact 21 moves to the non-conductive portion 26 again, the reverse turning force P is applied to the crankshaft 4 again, whereby the contact 21 is pushed back to the conductor plate 25. Thereafter, this operation is repeated, whereby the chattering phenomenon, in which continuity and discontinuity are repeated between the contact and the conductor plate, is generated.

However, in this embodiment, the clutch-member 16 is interposed between the driving gear 12 and the second contact 21, so that the above-described chattering phenomenon can be prevented.

More specifically, as shown in FIG. 4, in the case where the wiper blade 11 is moved to the bottom portion of the window and acted thereon with a push-back force of the snow 41, when the second contact 21 moves through the second conductor plate 25 and reaches the non-conductive portion 26, the second contact 21 is electrically opened from the conductor plate 25, whereby the motor 31 is deenergized. At this time, when the reverse turning force P acts on the crankshaft 4, the driving gear 12 is rotated in the reverse direction because the driving gear 12 is integrally formed on this crankshaft 4. However, such an arrangement is adopted that the engageable portion 13 on the driving side and the engageable portion 18 on the driven side are disengaged from each other when the driving gear 12 rotates in the reverse direction, whereby, even if the driving gear 12 rotates in the reverse direction, the clutch member 16 is not rotated in the reverse direction. In short, only the driving gear 12 is rotated in the reverse direction and the clutch member 16 is left behind, whereby the second contact 21 projectingly provided on the clutch member 16 maintains the contact with the non-conductive portion 26. With this arrangement, the non-conductive conditions to the motor 31 is maintained, whereby the motor 31 remains stopped and the wiper blade 11 continues to stop at the corner of the bottom of the window.

In this embodiment, by interposing the clutch member between the driving gear and the switch, the chattering phenomenon, which may occur when the force in a direction reverse to the normal direction acts on the driving gear due to the accumulation of snow and the like, can be prevented, so that deterioration of this portion due to the heat generated between the conductor plate and the contact due to the chattering phenomenon can be prevented and durability of this portion can be improved.

The clutch member is formed of an electrically conductive plate material and the contacts are projectingly, integrally provided on this clutch member, whereby continuity between the contacts and the force of pressing contact of the contacts against the conductor plates can be obtained by the clutch member itself, so that the number of parts and the number of man-hours for assembling can be reduced.

A plurality of first contacts are provided in symmetry at positions opposite to the second contact, whereby the load acting on between the clutch member and the pivot can be applied to the pivot uniformly, so that the pivot can be prevented from being worn.

The conductor plates are fixed to the side of the housing, whereby the clutch member is simplified in construction and rendered compact in size and the grounding to the vehicle body can be directly obtained not through the driving gear and a bearing portion thereof, so that a reliable grounding can be created.

The conductor plates are planted in the insulated base, so that the number of parts and the number of man-hours for assembling can be reduced.

Figure 5:
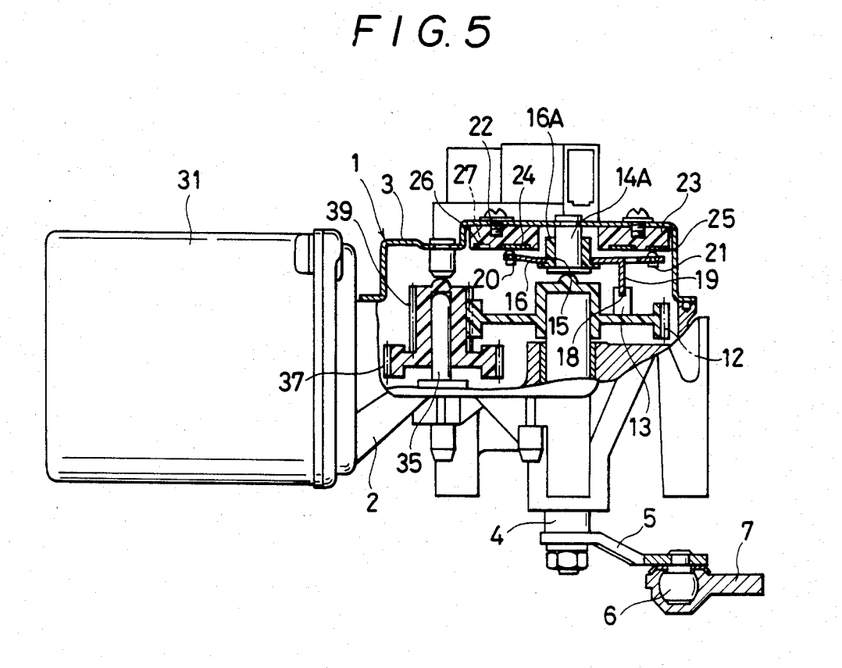
FIG. 5 is a longitudinal sectional view of the essential portions showing another embodiment of the present invention.

FIG. 5 is a longitudinal sectional view of the essential portions showing another embodiment of the present invention.

A difference of this second embodiment from the first embodiment resides in that the clutch member 16 is provided at the side of the housing 1 and rotatably supported. More specifically, affixed to the lid member 3 of the housing 1 is a pivot 14A center-aligned with the center line of the driving gear 12, and the clutch member 16 is rotatably coupled to this pivot 14A through an insulator 16A.

In this second embodiment, the clutch member 16 is separated from the driving gear 12, so that such a danger can be avoided that the clutch member 16 is rotated together with the driving gear 12 due to grease or the like adhering to the driving gear 12 when the driving gear 12 rotates in the reverse direction.

Figure 6:
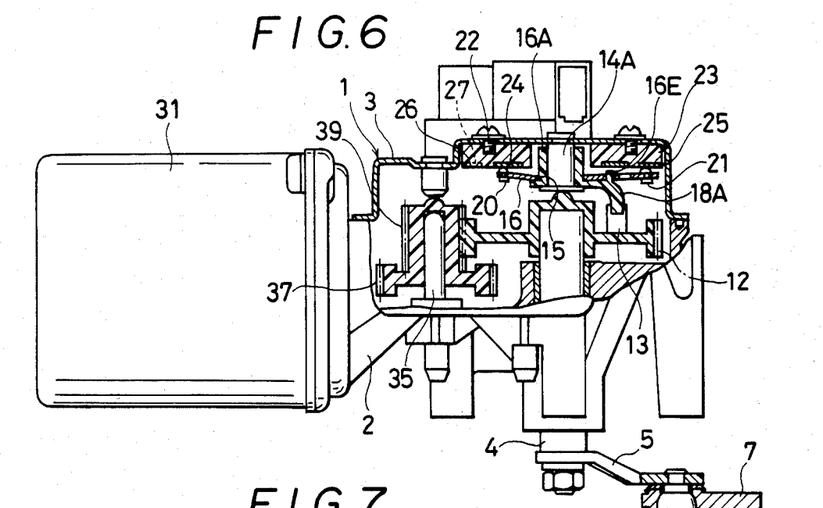
FIG. 6 is a longitudinal sectional view showing a further embodiment of the present invention.

FIG. 6 is a longitudinal sectional view showing a further embodiment of the present invention.

This third embodiment is identical with the second embodiment as shown in FIG. 5 in that the clutch member 16 is provided at the side of the housing 1, but different from the second embodiment in that there is provided a mechanism for rotating the clutch member 16 by a rotary driving force from the driving gear 12 in the biasing direction thereof, i.e. the direction of normal direction.

More specifically, an engageable portion 18A on the driven side in this third embodiment is not the bent portion of the clutch member 16 itself, but one end, i.e. a free end of the insulator 16A, the other end i.e. the proximal end of which is secured to the pivot 14A, is downwardly bent in an integral forming. This engageable portion 18A on the driven side is engaged with the engageable portion 13 on the driving side only when the clutch member 16 rotates in the biasing direction, and connected in operational association to the clutch member 16 as will be described hereunder.

Description will now be given of the clutch member 16 and the engageable portion 18A on the driven side for use in this third embodiment and the relationship in operational association and connection therebetween.

Figure 7:
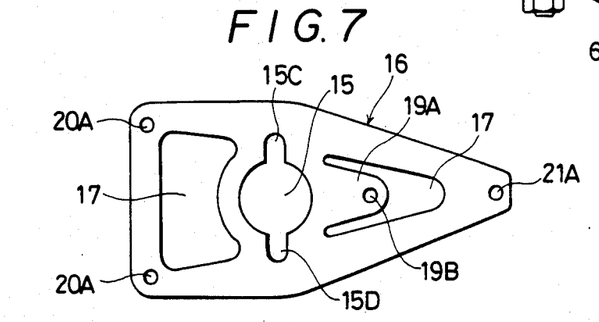
FIG. 7 is a plan view showing the clutch member used in the embodiment shown in FIG. 6.

Firstly, as shown in FIG. 7, the clutch member 16 as a whole is punchingly formed into a generally pentagonal shape, provided in the substantially central portion thereof with the shaft hole 15 for inserting therethrough the pivot 14A and the insulator 16A and at opposite sides of the shaft hole 15 thereof with window holes 17, and one of the window holes 17 is formed with a tongue piece 19A. Furthermore, in three corner portions of the clutch member 16, there are formed two contact mounting holes 20A for mounting the two first contacts 20 and a contact mounting hole 21A for mounting the second contact 20. Further, the shaft hole 15 is formed with engageable cutaway portions 15C and 15D which are opposed to each other in the diametral direction. Furthermore, the tongue piece 19A is formed with an engageable hole 19B.

Figures 8A, 8B:
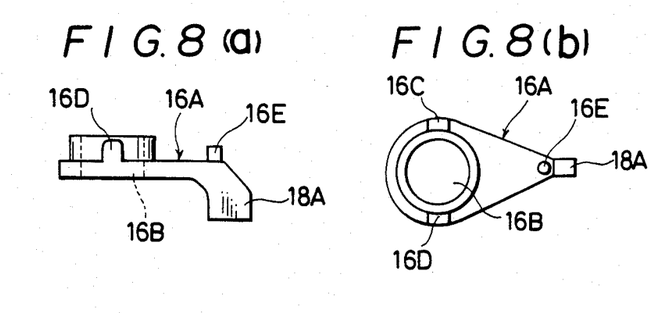
FIGS. 8(a) and 8(b) are a side view and a plan view showing the engageable member on the drive side for use in the embodiment shown in FIG. 6.

On the other hand, the insulator 16A formed at the free end thereof with the engageable portion 18A on the driven side is provided with: a shaft hole 16B for inserting therethrough the pivot 14A; engaging projections 16C and 16D, which are formed at opposite sides in the diametral direction of the shaft hole 16B and insertable into and engageable with the aforesaid engageable cutaway portions 15C and 15D of the clutch member 16, respectively; and an engaging projection 16E insertable into the aforesaid engageable hole 19B, as shown in FIGS. 8(a) and 8(b), in addition to the aforesaid engageable portion 18A.

In consequence, in this third embodiment, the engageable portion 18A on the driven side engageable with the engageable portion 13 on the driving side is integrally formed on the insulator 16A as a portion thereof, so that the clutch member 16 need not be large-sized beyond necessary for forming the engageable portion on the driven side. Furthermore, the force applied to the engageable portion 18A on the driven side during engagement between the engageable portions 13 and 18A is mainly transmitted from the engageable portion 13 to the engageable portion 18A through the engagement between the engageable cutaway portions 15C and 15D, which are positioned around the rotary axis of the pivot 14A, and the engaging projections 16C and 16D, so that such outstanding advantages can be offered that deformation of the clutch member 16 by the driving force of the driving gear 12 is minimized, contact failure between the contacts 20, 20 and 21 and the conductor plates 24 and 25 due to the deformation of the clutch member 16 can be prevented from occurring and stable contacts can be secured.

Addtionally, in this third embodiment, when the housing 1 is formed of a insulating material such for example as synthetic resin, the insulator need not necessarily be formed of an insulating material. The same thing is true of the case in the second embodiment.

Figure 9:
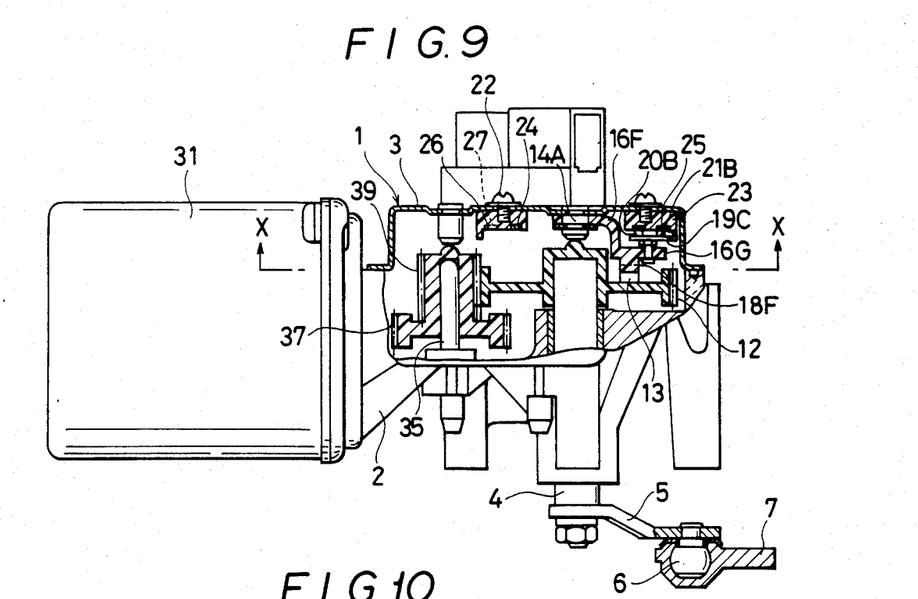
FIG. 9 is a longitudinal sectional view showing a still further embodiment of the present invention.
Figure 10:
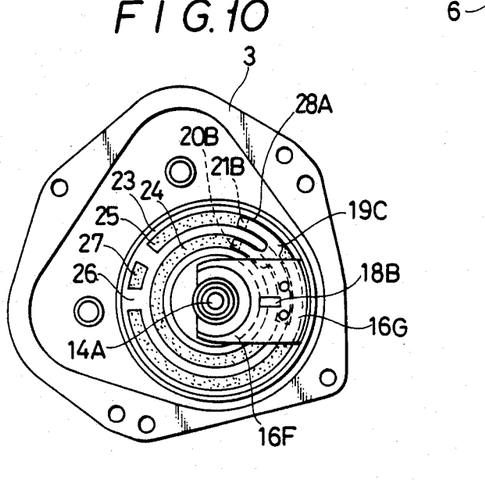
FIG. 10 is a bottom view taken along the line X—X in FIG. 9.

FIG. 9 is a longitudinal sectional view showing the fourth embodiment of the wiper driving unit according to the present invention and FIG. 10 is a bottom view taken along the line X—X in FIG. 9.

In this fourth embodiment, a clutch member 16F is integrally formed of an insulating material such for example as rigid synthetic resin. This clutch member 16F is coupled at one end thereof to the pivot 14A and rotatably supported in a cantilever manner, being locked against dislodging by a snap ring 42. Furthermore, a free end portion 16G of the clutch member 16F is provided in parallel and close to the driving gear 12, and an engageable portion 18B on the driven side is projectingly provided on the undersurface of the free end portion 16G to be engaged with the engageable portion 13 on the driving side of the driving gear 12 only when the driving gear 12 rotates in the normal direction. A movable piece 19C made of a conductive sheet spring and formed into a generally bifurcated fork shape is solidly secured at one end thereof to the top surface of the free end portion 16G of the clutch member 16F and supported thereon, and a first contact 20B and a second contact 21B are projectingly provided on the top surface of the bifurcated free ends of the movable piece 19C.

Furthermore, in this fourth embodiment, the second contact 21B is constantly in sliding contact with the circular orbit drawn by the second conductor plate 25, the non-conductive portion 26 and the stop position piece 27 by a resilient force of the movable piece 19C.

In the electric circuit including the power source 29, the wiper switch 30, the motor 31 and so on, the first conductor plate 24, the second conductor plate 25 and the stop position piece 27 are connected to one another as shown in FIG. 4, to thereby constitute a switch 28A for opening or closing the electric circuit of the motor.

In this fourth embodiment also, the engageable portion 18B on the driven side projectingly provided on the free end portion 16G of the clutch member 16F is engaged with the engageable portion 13 on the driving side of the driving gear 12 to cause the driving gear 12 and the clutch member 16F to rotate together only when the driving gear 12 rotates in the normal direction, i.e. the biasing direction, and, when the force to rotate the driving gear 12 in the reverse rotating direction is applied, the engageable portion 18B on the driven side is disengaged from the engageable portion 13 on the driving side. In consequence, only the driving gear 12 is rotated in the reverse direction and the clutch member 16F is left behind, whereby the second contact 21 on the movable piece 19C supported on the clutch member 16F can be held in contact with the non-conductive portion 26. With this arrangement, the non-conductive conditions to the motor 31 is maintained, whereby the motor 31 remains stopped and the wiper blade 11 remains stopped at the corner of the bottom of the window.

In this fourth embodiment, by interposing the clutch member between the driving gear and the movable piece, the chattering phenomenon, which may occur when the force in a direction reverse to the normal direction acts on the driving gear due to the accumulation of snow and the like, can be prevented, so that deterioration of this portion due to the heat generated between the conductor plate and the contact due to the chattering phenomenon can be prevented and durability of this portion can be improved.

The conductor plates are fixed to the housing's side, whereby the clutch member can be simplified in construction, rendered compact in size, and the grounding to the vehicle body can be directly obtained not through the driving gear and a bearing portion thereof, so that reliable grounding conditions can be created.

The conductor plates are insert molded in the insulated base, so that the number of parts and the number of man-hours for assembling can be reduced.

In this fourth embodiment, it is not limited to provide the conductor plates on the housing's side and the contacts on the clutch member's side as in the above-described construction, and the conductor plates may be provided on the clutch member's side and the contacts on the housing's side.

Additionally, the present invention need not necessarily be limited to the above-described embodiments, and, needless to say that the present invention may be modified within the scope not departing from the technical gist thereof.

For example, the provision of the contacts is not limited to that tips are solidly secured to the clutch member, and such an arrangement may be adopted that portions of the clutch member are projected or not projected and brought into sliding contact with the conductor plates as they are.

Such an arrangement may be adopted that the engageable portion on the driving side of the driving gear is engaged with the engageable portion on the driven side in a direction reverse to the normal rotating direction by the reverse rotation of the driving gear, whereby the clutch member is rotated in the reverse direction.

The driving gear may be directly driven by a worm or worms.

As has been described hereinabove, according to the present invention, the clutch member, which can rotate together with the driving gear only in one direction, is provided, and the conductor plates and the contacts are interposed between the clutch member and the housing and adapted to rotate relatively with each other, so that a relative backward moving phenomenon between the contacts and the conductor plates, which occurs when the reverse rotating force acts on the driving gear, can be prevented.

What is claimed is:

1. A wiper driving unit comprising:
   a driving gear driven by a motor, for driving a wiper;
   a clutch member formed of a conductive resilient plate material and rotatably provided in a manner to rotate together with said driving gear in one direction of rotation of said driving gear;
   means including a driving side engageable member on said driving gear and a driven side engageable member to be engaged with said driving side engageable member for transmitting a driving force of said driving gear to said clutch member only when said driving gear is rotated in said one direction so that said clutch member can rotate together with said driving gear in said one direction only when said driving gear is rotated in said one direction; and
   conductor plates connected to an electric circuit of said motor; wherein said clutch member rotates in sliding contact with said conductor plates to thereby constitute a switch for opening and closing the electric circuit of said motor.

2. A wiper driving unit as set forth in claim 1, wherein a plurality of contacts are provided on said clutch member so that a resilient force of said clutch member rotatable in sliding contact with the conductor plates can be uniformly acting loads on the conductor plates.

3. A wiper driving unit as set forth in claim 1, wherein said clutch member is rotatably supported on said driving gear.

4. A wiper driving unit as set forth in claim 1, wherein said clutch member is rotatably supported on a housing.

5. A wiper driving unit as set forth in claim 1, wherein said conductor plates are provided on a housing concentrically with an extension of the rotary center of said driving gear.

6. A wiper driving unit as set forth in claim 1, wherein said engageable member on the driven side is connected in operational association to at least a portion of said clutch member.

7. A wiper driving unit as set forth in claim 1, wherein said engageable member is directly secured to a rotary pivot of said clutch member.

8. A wiper driving unit as set forth in claim 7, wherein said engageable member on the driven side is secured to a rotary pivot used commonly with said conductive resilient plate material of said clutch member, and having projections engageable with engageable cutaway portions in said conductive resilient plate material.

9. A wiper driving unit as set forth in claim 1, wherein said engageable member on the driven side comprises a punched and bent portion of said conductive resilient plate material.

10. A wiper driving unit as set forth in claim 2, wherein said contacts on said clutch member comprise at least two first contacts and at least one second contact provided at a position opposite to said first contacts.

11. A wiper driving unit comprising:
    a driving gear driven by a motor, for driving a wiper;
    a clutch member rotatably supported on a housing and adapted to rotate together with said driving gear in one direction of rotation of said driving gear;
    means including a driving side engageable member on said driving gear and a driven side engageable member to be engaged with said driving side engageable member for transmitting a driving force of said driving gear to said clutch member only when said driving gear is rotated in said one direction so that said clutch member can rotate together with said driving gear in said one direction only when said driving gear is rotated in said one direction; and
    conductor plates and contacts, which constitute a switch for opening or closing an electric circuit of said motor;
    wherein said conductor plates and said contacts are interposed between said housing and said clutch member and rotated relative to each other in sliding contact with each other by rotation of said clutch member.

12. A wiper driving unit as set forth in claim 11, wherein said conductor plates are provided on a housing concentrically with an extension of the rotary center of said driving gear.

* * * * *